(12) United States Patent
Vuletici

(10) Patent No.: US 11,073,597 B2
(45) Date of Patent: Jul. 27, 2021

(54) THREE-DIMENSIONAL POINT CLOUD GENERATED BY HIGH-RESOLUTION FLASH LIDAR

(71) Applicant: Continental Automotive Systems, Inc., Auburn Hills, MI (US)

(72) Inventor: Goran Vuletici, Santa Barbara, CA (US)

(73) Assignee: Continental Automotive Systems, Inc., Auburn Hills, MI (US)

(*) Notice: Subject to any disclaimer, the term of this patent is extended or adjusted under 35 U.S.C. 154(b) by 407 days.

(21) Appl. No.: 15/977,723

(22) Filed: May 11, 2018

(65) Prior Publication Data

US 2019/0347850 A1 Nov. 14, 2019

(51) Int. Cl.
| | |
|---|---|
| *G06T 17/05* | (2011.01) |
| *G01S 17/89* | (2020.01) |
| *G01S 7/48* | (2006.01) |
| *G06T 19/00* | (2011.01) |
| *G01S 7/00* | (2006.01) |
| *G01S 17/894* | (2020.01) |

(52) U.S. Cl.
CPC ............ *G01S 7/003* (2013.01); *G01S 7/4808* (2013.01); *G01S 17/894* (2020.01); *G06T 17/05* (2013.01); *G06T 19/00* (2013.01)

(58) Field of Classification Search
CPC ......... G06T 19/00; G06T 17/05; G06T 17/00; G01S 17/931; G01S 7/003; G01S 7/4808; G01S 17/89; G01S 17/894; G01S 2013/9316
USPC ........................................................ 356/4.01
See application file for complete search history.

(56) References Cited

U.S. PATENT DOCUMENTS

| | | | |
|---|---|---|---|
| 9,862,316 B2* | 1/2018 | Heckel | G01S 17/931 |
| 10,614,503 B2* | 4/2020 | High | G01N 33/24 |
| 2018/0251122 A1* | 9/2018 | Golston | B60W 40/02 |

* cited by examiner

*Primary Examiner* — Daniel L Murphy

(57) ABSTRACT

A method of operating a vehicle image system supported by a vehicle is provided. The method includes receiving data from one or more sensors supported by the vehicle. The one or more sensors capture sensor data of objects in the surrounding environment of the vehicle. The method also includes receiving a storage indication from a user input device. The storage indication is indicative of storing the data from the one or more sensors in the non-transitory memory. The method also includes storing the data after receiving the storage indication and transmitting a command to one or more remote devices causing the one or more remote devices to generate a two-dimensional image or a three-dimensional object based on the received data.

12 Claims, 4 Drawing Sheets

THREE-DIMENSIONAL POINT CLOUD GENERATED BY HIGH-RESOLUTION FLASH LIDAR

TECHNICAL FIELD

The disclosure relates to a method and device for generating a three-dimensional point cloud using a high-resolution flash LIDAR. The point cloud allows for three-dimensional printing of an object from the surrounding environment.

BACKGROUND

In recent years, use of computers, smartphones, and other Internet-connected devices has grown exponentially. Correspondingly, most of these devices include a camera that is capable of capturing photographs and videos (including audio). These camera phones are usually less complicated than a traditional camera (e.g., a digital camera); however, camera phones have greatly improved the quality of the pictures. Therefore, it is easy for a person to take a picture using a camera phone and share it with the world via social media within a matter of seconds. Social media allows people to create, share, or exchange information and ideas in virtual communities or networks. Social media depends on mobile and web-based technologies to allow people to share, co-create, collaborate on, discuss, and modify user-generated content. One aspect of social media is photo sharing, which allows a user to transfer his/her personal digital photos online and share the photos with others, privately or publicly.

Moreover, recently, there has been a surge in sensor technologies relating to vehicles, including autonomous and semi-autonomous vehicles. Arrangements and methods for detecting and avoiding collisions are becoming available. Sensors and cameras located on the vehicle may be used to alert a driver of possible obstacles when the vehicle is traveling in a forward direction or a rearward direction.

Therefore, it is desirable to provide a system that combines the vehicle images and/or sensors with the capability of image and/or data sharing.

SUMMARY

One aspect of the disclosure provides a method of operating a vehicle image system supported by a vehicle. The vehicle image system includes a computing device and non-transitory memory in communication with the computing device. The method includes receiving, at the computing device, data from one or more sensors in communication with the computing device and supported by the vehicle. The one or more sensors are configured to capture sensor data of objects in the surrounding environment of the vehicle. The method also includes receiving, at the computing device, a storage indication from a user input device. The user input device is in communication with the computing device. The storage indication is indicative of storing the data from the sensors in the non-transitory memory. The method also includes storing, at the non-transitory memory, the data after receiving the storage indication. The method also includes transmitting, from the computing device, a command to one or more remote devices causing the one or more remote devices to generate a two-dimensional image or a three-dimensional object based on the received data.

Implementations of this aspect of the disclosure may include one or more of the following optional features. In some implementations, the method further includes generating, at the computing device, point cloud data based on the stored data. The two-dimensional image or the three-dimensional object may be based on the point cloud data.

In some implementations, the one or more sensors include a high-resolution flash light detection and ranging laser scanner. The vehicle image system may be in communication with the one or more remote devices via a network.

In some examples, the command is transmitted to one or more remote devices by way of an export device. The export device may be a wired data export device or a wireless data export device. In some examples, the method further includes receiving, at the computing device, a user command from a driver. The user command is indicative of initiating transfer of the received data to the one or more remote devices.

Another aspect of the disclosure provides a vehicle image system supported by a vehicle. The vehicle image system includes a computing device in communication with a user input device supported by the vehicle, and non-transitory memory in communication with the computing device. The non-transitory memory stores instructions that when executed on the computing device cause the computing device to perform operations. The operations include receiving data from one or more sensors in communication with the computing device and supported by the vehicle. The one or more sensors are configured to capture sensor data of objects in the surrounding environment of the vehicle. The operations include receiving a storage indication from the user input device. The storage indication is indicative of storing the data from the sensors in the non-transitory memory. The operations also include storing the data, at the non-transitory memory, after receiving the storage indication and transmitting a command to one or more remote devices causing the one or more remote devices to generate a two-dimensional image or a three-dimensional object based on the received data.

Implementations of this aspect of the disclosure may include one or more of the following optional features. In some implementations, the operations further include generating point cloud data based on the stored data. The two-dimensional image or the three-dimensional object may be based on the point cloud data. In some examples, the one or more sensors include a high-resolution flash light detection and ranging laser scanner. The vehicle image system may be in communication with the one or more remote devices via a network. The command is transmitted to one or more remote device by way of an export device. The export device may be a wired data export device or a wireless data export device. The operations may further include receiving a user command from a driver. The user command is indicative of initiating transfer of the received data to the one or more remote devices.

The details of one or more implementations of the disclosure are set forth in the accompanying drawings and the description below. Other aspects, features, and advantages will be apparent from the description and drawings, and from the claims.

DETAILED DESCRIPTION

Vehicles, including autonomous vehicles and semi-autonomous vehicles, support sensors and cameras that are used to alert a driver of possible obstacles when the vehicle is traveling in a forward or rearward direction. A vehicle that includes a sensor system that is capable of capturing images and sensor data and which allows a driver of the vehicle to access the captured sensor data for other uses is desirable.

Figure 1:
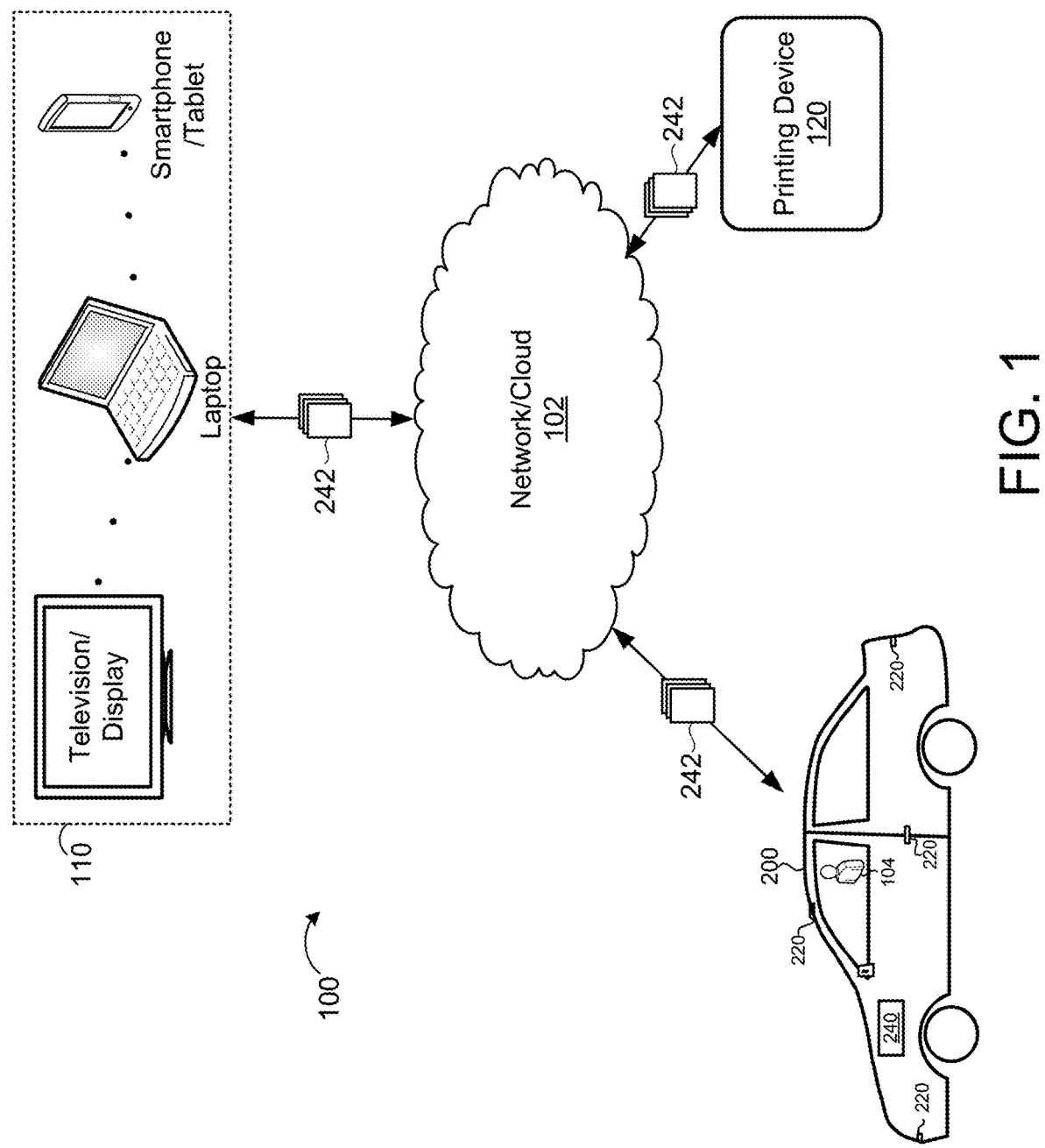
FIG. 1 is a schematic view of an exemplary vehicle-sensor sharing system.
Figure 2A:
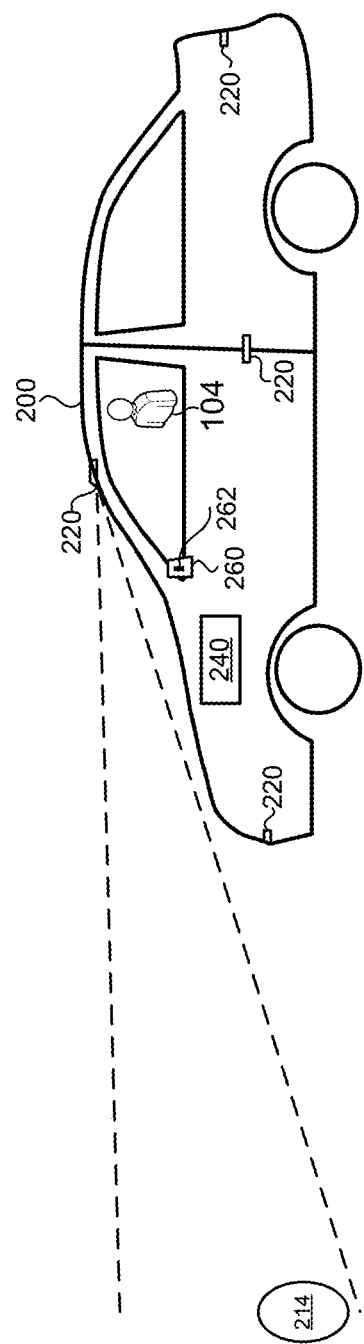
FIGS. 2A and 2B are schematic views of an exemplary vehicle having a sensor system.
Figure 2B:
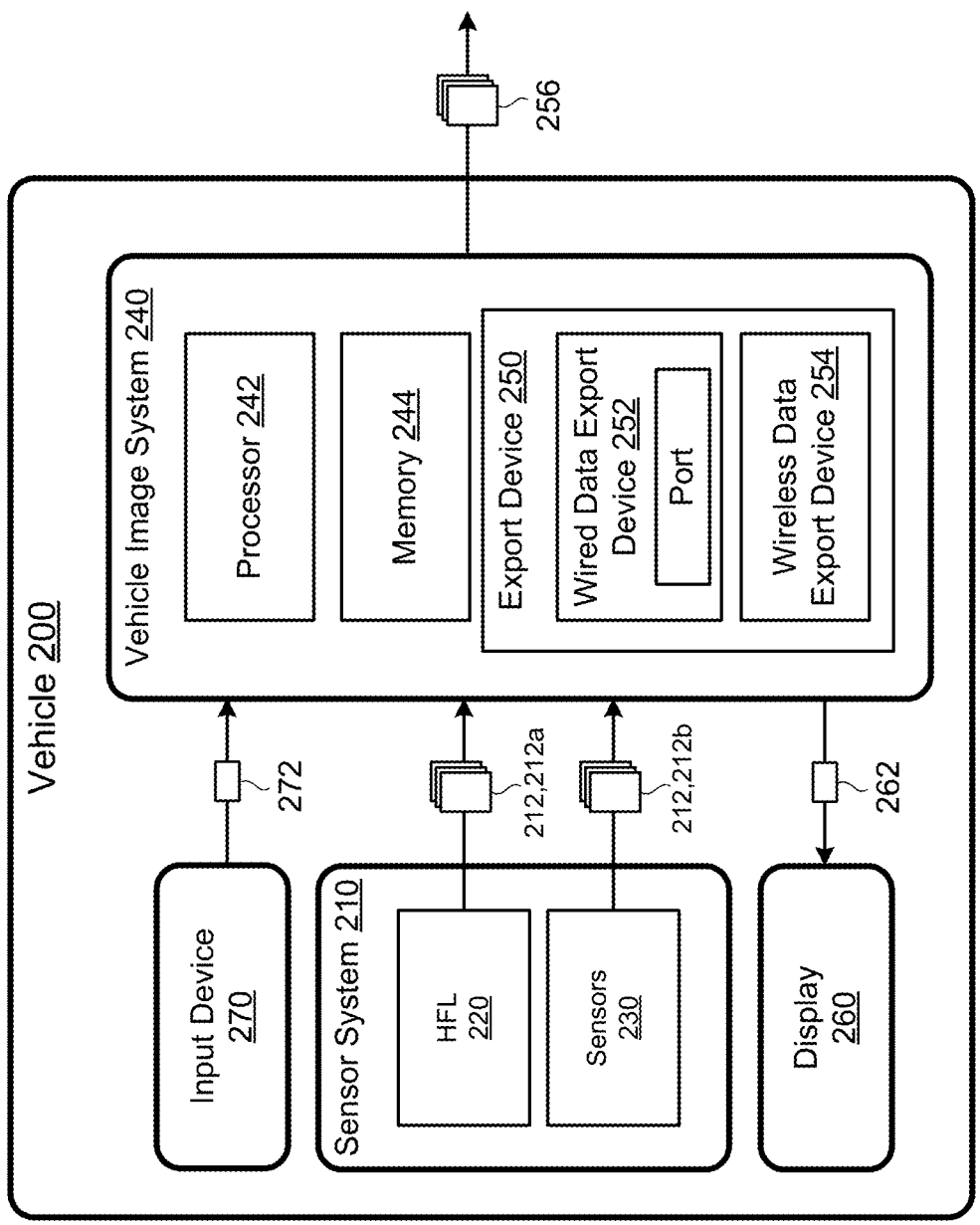

Referring to FIGS. 1-2B, in some implementations a vehicle-sensor sharing system 100 includes a vehicle 200 supporting a sensor system 210. The sensor system 210 may provide sensor data 212 of one or more objects 214 in the surrounding environment of the vehicle 200. For example, the sensor system 210 may be positioned on a front portion of the vehicle 200, and thus the sensor system 210 captures sensor data 212 of one or more objects 214 in the front environment of the vehicle 200. In some implementations, the vehicle-sensor sharing system 100 also includes a network 102 that allows communication between one or more devices 110, 120 and the vehicle 200. Additionally or alternatively, the vehicle-sensor sharing system 100 may include an export device 250 supported by the vehicle 200 that allows transfer of point cloud data 256 from the vehicle 200 to other devices, e.g., user devices 110 or a 3D printer 120.

In some implementations, the sensor system 210 includes one or more imaging sensors such as LIDAR sensors, for example high-resolution three-dimensional flash LIDAR (HFL) sensors 220. HFL sensors 220 provide real-time machine vision and environmental mapping. As such, HFL sensors 220 provide a detailed and accurate field of vision around the vehicle, independent of day or night and the weather conditions. HFL sensors 220 may include a three-dimensional depth sensing device that captures three-dimensional (3D) point clouds. 3D flash LIDAR captures 3D and intensity data at the speed of light. In some examples, an entire frame of data at 200 meter range is captured in 1.32 microseconds at 30 times per second. HFL allows for differentiation and separation of objects. The functioning principle of HFL is similar to a two-dimensional camera. HFL have 3D focal plane array with rows and columns of pixels which are capable of seeing the depth. The environment in front of an HFL camera is illuminated by a pulse laser and objects are illuminated while photonic energy is "back scattered" toward the 3D focal plane array where each pixel is collecting photonic energy.

In other examples, the sensor system 210 includes other sensors 220, such as imaging sensors and/or proximity sensors (e.g., infrared sensors, sonar sensors and/or stereo sensors). The captured sensor data 212a from the HFL sensors 220 (i.e., 3D volumetric point clouds) and the captured sensor data 212b from the other sensors 230 may overlap.

In some examples, the HFL sensor 220 is mounted on a front portion of the vehicle, as shown in FIG. 2A to provide a front view of the vehicle environment. In other examples, HFL sensors 220 are mounted on the sides of the vehicle 200 (e.g., doors, panels), and/or the rear of the vehicle, thus providing a 360 degree coverage.

The vehicle 200 includes a vehicle image system 240. The vehicle image system 240 includes a processor 242 in communication with non-transitory memory 244. The non-transitory memory 244 may be physical devices used to store programs (e.g., sequences of instructions) or data (e.g., program state information) on temporary or permanent basis for use by the processor 242. The non-transitory memory 244 may be volatile and/or non-volatile addressable semi-conductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes. The vehicle image system 240 receives the sensor data 212 and determines point cloud data 256 (based on the received sensor data 212) that can be shared with other devices 110, 120.

In some examples, the vehicle image system 240 uses the memory 244 to store the sensor data 212 when the driver 104 pushes a button by way of an input device 270, such as a button on the steering wheel or display 260. The input device 270 provides an indication 272 to the vehicle image system 240 to begin storing the received sensor data 212. A second push/press of the button may be indicative of stopping the storing of the sensor data 212. In examples, a voice command is available to indicate beginning/stopping storage of the sensor data 212

In some implementations, the vehicle image system 240 includes an export device 250 configured to transfer the captured sensor data 212 and/or point cloud data 256 to one or more user devices 110 or 3D printing devices 120. The export device 250 may include a wired data export device 252 and/or a wireless data export device 254. The wired data export device 252 is configured to provide the driver with a wired connection for transferring the sensor data 212 and/or the point cloud data 256. The wired data export device 252 may include one or more input/output ports such as, but not limited to, HDMI, USB, Bluetooth, Ethernet, where any one of the ports may be used to communicate and transfer data with a user device 110 via a wire or directly to a data storage device.

The export device 250 may also include a wireless data export device 254 that allows for communication between the vehicle 200 and other devices e.g., user devices 110 or other devices such as a 3D printer 120 via a network 102. The network 102 may include any type of network that allows sending and receiving communication signals, such as a wireless telecommunication network, a cellular telephone network, a time division multiple access (TDMA) network, a code division multiple access (CDMA) network, Global system for mobile communications (GSM), a third generation (3G) network, fourth generation (4G) network, a satellite communications network, and other communication networks. The network 102 may include one or more of a Wide Area Network (WAN), a Local Area Network (LAN), and a Personal Area Network (PAN). In some examples, the network 102 includes a combination of data networks, telecommunication networks, and a combination of data and telecommunication networks.

In some examples, the vehicle image system 240 provides the driver 104 with one or more indicators 262 that are visible to the driver 104, for example by way of a display 260. The one or more indicators 262 provide an indication of a status of the data transfer, e.g., wired data transfer via the wired data export device 252 or wireless data transfer via the wireless export device 254. The indication 262 may be displayed on the display 260 such as, but not limited to, a vehicle display or an instrument panel.

In some implementations, the vehicle image system 240 stores the sensor data 212 and the point cloud data 256 in the memory 244 and transfers the sensor data 212 and/or point cloud data 256 at a later time to the one or more devices 110, 120.

The user device 110 may be any computing device capable of communicating with the vehicle 200 via the network 102 and receiving sensor data 212 from the vehicle 200. User devices 110 include, but are not limited to, mobile computing devices, such as video cameras, photo cameras, laptops, smart phones or tablets, wearable computing devices (e.g., headsets and/or watches). User devices 110 may also include other computing devices having other form factors, such as computing devices included in desktop computers, vehicles, gaming devices, televisions, or other appliances (e.g., networked home automation devices and home appliances).

The point cloud image 256 from the vehicle image system 240 may have several uses, such as, but not limited to, sharing the point cloud image 256 with a user device, exporting the point cloud image 256 to social media, 3D printing, size tracking of an object, and virtual reality.

Share pictures with user devices: The vehicle image system 240 may be linked to one or more user devices 110 via the network 102. As such, the vehicle image system 240 may transmit the point cloud image 256 to the user device 110. The user device 110 may be any computing device capable of receiving point cloud image 256 from the vehicle image system 240. The user device 110 may include, but is not limited to, a mobile computing device, a wearable computing device (e.g., smart watch). The user device 110 may also include other computing devices having other form factors, such as computing devices included in desktop computers, vehicles, gaming devices, televisions, or other appliances (e.g., networked home automation devices and home appliances). In some examples, the user device 110 executes an application that initiates retrieval of sensor data 212 stored on the vehicle memory 244.

Export 3D pictures to social media: In some examples, the vehicle image system 240 may be linked to one or more social media user accounts. As such, after the driver 104 indicates that the vehicle image system 240 starts storing the sensor data 212, then the vehicle image system 240 prompts the driver 104, via a user display, if the user wants to share the point cloud image 256 through the social media account linked with the vehicle image system 240.

3D printing: In some implementations, the vehicle image system 240 is in communication with a three-dimensional (3D) printer or a 3D printing service 120 that is capable of printing a 3D object. 3D printing is a process in which material is joined or soldered under computer control to create the 3D object. The 3D object may be of any shape or geometry and is generated using digital model data from a 3D model, such as the point cloud image 256 from the sensor system 210 of the vehicle 200. Therefore, the vehicle image system 240 may send the 3D printer or the 3D printing service 120 the point cloud image 256 for printing. The driver may want to 3D print a pet, a garage, a building, monuments, and/or other detected objects captured by the sensor system 210 while the vehicle is traveling or while the vehicle is parked.

Size track of objects: In some examples, the driver 104 may want to monitor the growth of a specific object, e.g., pet or a plant. Therefore, the vehicle image system 240 may identify point cloud image 256 that includes the monitored object, and every time the monitored object is identified, the vehicle image system 240 saves the point cloud image 256. As such, the vehicle image system 240 may then measure the size of the object based on the sensor data received at different times.

Virtual reality: In addition, the vehicle image system 240 may store the point cloud image 256 and export it for use to generate a virtual reality for game or simulation, for example.

Figure 3:
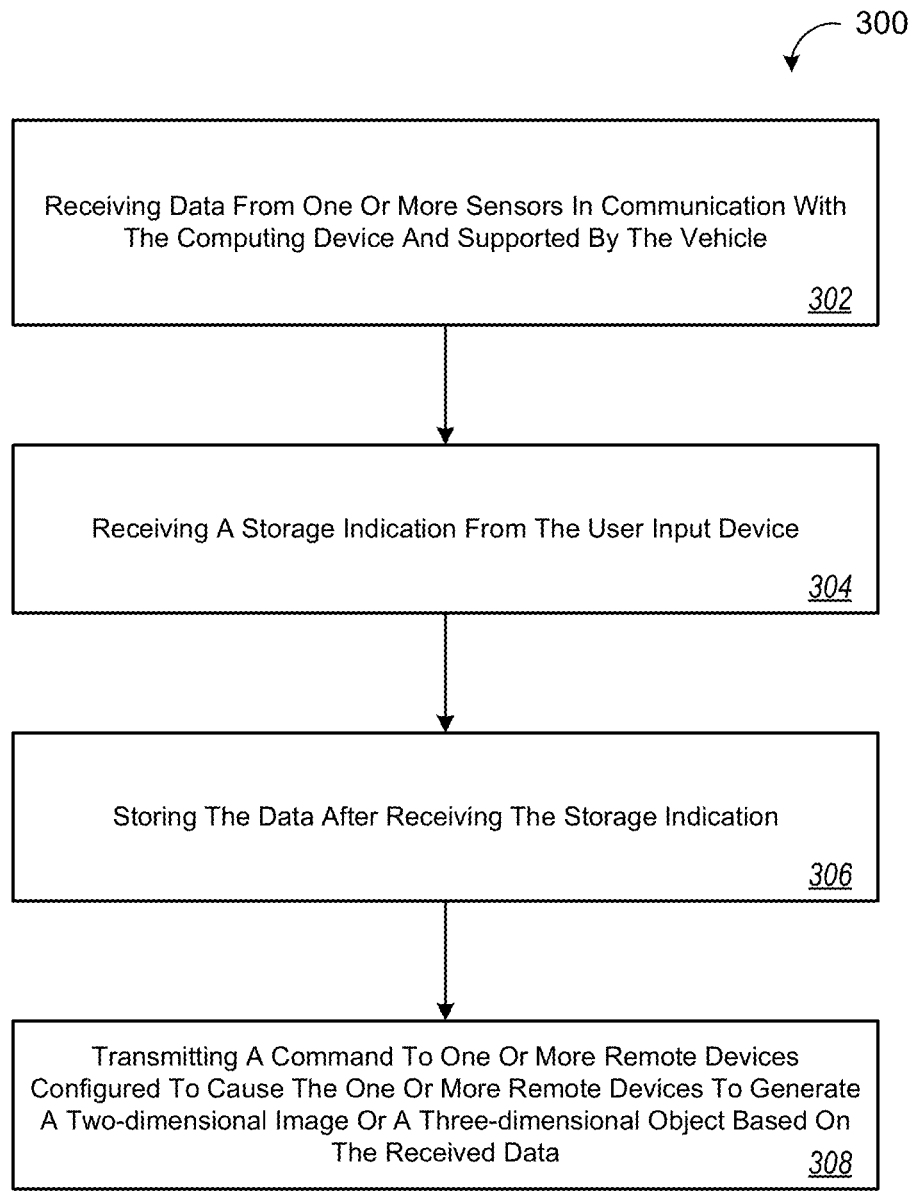
FIG. 3 is an exemplary flowchart for operating a vehicle for sharing sensor data.

FIG. 3 provides an example arrangement of operations for a method 300 of operating a vehicle image system 240 supported by a vehicle 200 using the vehicle-sensor sharing system 100 of FIGS. 1-2B. The vehicle image system 240 includes a computing device (e.g., processor 242) and non-transitory memory (e.g., memory 244) in communication with the computing device 242. At block 302, the method 300 includes receiving, at the computing device 242, sensor data 212, 212a, 212b from one or more sensors 220, 230 in communication with the computing device 242 and supported by the vehicle 200. The one or more sensors 220, 230 are configured to capture sensor data 212, 212a, 212b of objects 214 in the surrounding environment of the vehicle 200. At block 304, the method 300 includes receiving, at the computing device 242, a storage indication 272 from the user input device 270. The storage indication 272 is indicative of storing the data 212, 212a, 212b from the sensors 220, 230 in the non-transitory memory 244. At block 306, the method 300 includes storing, at the non-transitory memory 244, the data 212, 212a, 212b after receiving the storage indication 272. At block 308, the method 300 includes transmitting, from the computing device 242, a command to one or more remote devices causing the one or more remote devices 110, 120 to generate a two-dimensional image or a three-dimensional object based on the received data 212, 212a, 212b.

In some examples, the method 300 includes generating, at the computing device 242, point cloud data 256 based on the stored data. The two-dimensional image or the three-dimensional object is based on the point cloud data. The one or more sensors 220, 230 include a high-resolution flash light detection and ranging laser scanner (HFL) 220. The vehicle image system 240 is in communication with the one or more remote devices 110, 120 via a network 102. The command is transmitted to one or more remote device 110, 120 by way of an export device 250 (e.g., a wired data export device 252 or a wireless data export device 254).

In some implementations, the method 300 includes receiving, at the computing device 242, a user command from a driver. The user command is indicative of initiating transfer of the received data 212, 212a, 212b to the one or more remote devices 110, 120.

A number of implementations have been described. Nevertheless, it will be understood that various modifications may be made without departing from the spirit and scope of the disclosure. Accordingly, other implementations are within the scope of the following claims.

What is claimed is:

1. A method of operating a vehicle image system supported by a vehicle, the vehicle image system having a computing device and non-transitory memory in communication with the computing device, the method comprising:

receiving, at the computing device, data from one or more high-resolution flash LIDAR sensors in communication with the computing device and supported by the vehicle, the one or more high-resolution flash LIDAR sensors configured to capture sensor data of objects in the surrounding environment of the vehicle;

receiving, at the computing device, a storage indication from a user input device, the storage indication indicative of storing the data from the high-resolution flash LIDAR sensors in the non-transitory memory;

storing, at the non-transitory memory, the data after receiving the storage indication; and transmitting, from the computing device, a command to one or more remote devices remote from the vehicle causing the one or more remote devices to generate a three-dimensional object based on the received data.

2. The method of claim 1, further comprising:

generating, at the computing device, point cloud data based on the stored data;

wherein the three-dimensional object is based on the point cloud data.

3. The method of claim 1, wherein the vehicle image system is in communication with the one or more remote devices via a network.

4. The method of claim 1, wherein the command is transmitted to one or more remote device by way of an export device.

5. The method of claim 4, wherein the export device is a wired data export device or a wireless data export device.

6. The method of claim 4, further comprising:

receiving, at the computing device, a user command from a driver, the user command indicative of initiating transfer of the received data to the one or more remote devices.

7. A vehicle image system supported by a vehicle, the vehicle image system comprising:

a computing device in communication with a user input device supported by the vehicle; and non-transitory memory in communication with the computing device, the non-transitory memory storing instructions that when executed on the computing device cause the computing device to perform operations comprising:

receiving data from one or more high-resolution flash LIDAR sensors in communication with the computing device and supported by the vehicle, the one or more sensors configured to capture sensor data of objects in the surrounding environment of the vehicle;

receiving a storage indication from the user input device, the storage indication indicative of storing the data from the high-resolution flash LIDAR sensors in the non-transitory memory;

storing, at the non-transitory memory, the data after receiving the storage indication; and transmitting a command to one or more remote devices causing the one or more remote devices to generate a three-dimensional object based on the received data.

8. The vehicle image system of claim 7, wherein the operations further comprise generating point cloud data based on the stored data; and wherein the three-dimensional object is based on the point cloud data.

9. The vehicle image system of claim 7, wherein the vehicle image system is in communication with the one or more remote devices via a network.

10. The vehicle image system of claim 7, wherein the command is transmitted to one or more remote device by way of an export device.

11. The vehicle image system of claim 10, wherein the export device is a wired data export device or a wireless data export device.

12. The vehicle image system of claim 10, wherein the operations further comprise:

receiving a user command from a driver, the user command indicative of initiating transfer of the received data to the one or more remote devices.

* * * * *